H. W. LEAVITT.
TRACTOR.
APPLICATION FILED SEPT. 16, 1913.
1,141,126.
Patented June 1, 1915.
4 SHEETS—SHEET 1.
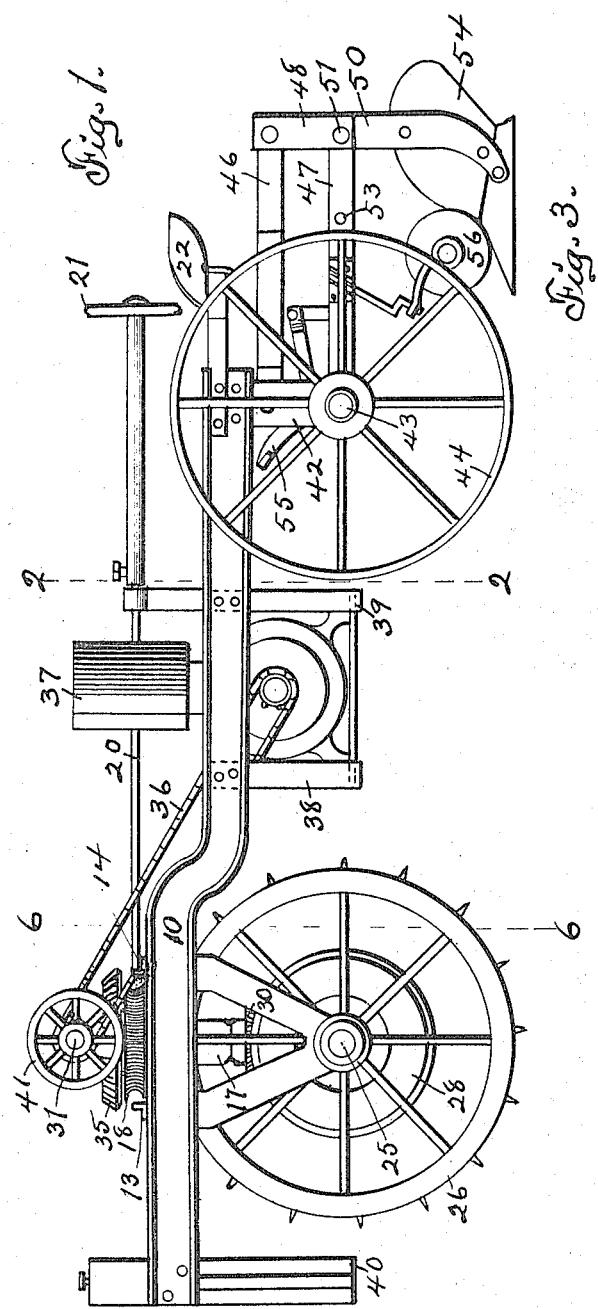
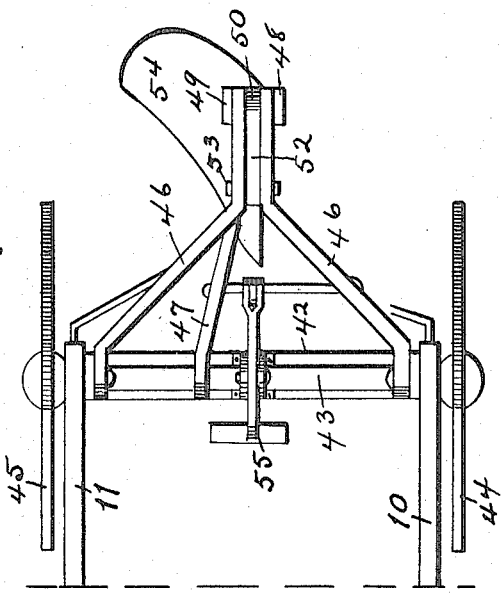
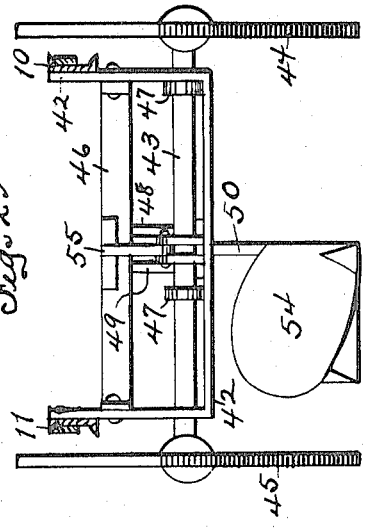
Attest:
S. C. Sweet.
H. Sweet.
Inventor:
Harry W. Leavitt H. W. LEAVITT.
TRACTOR.
APPLICATION FILED SEPT. 16, 1913.
1,141,126.
Patented June 1, 1915.
4 SHEETS—SHEET 2.
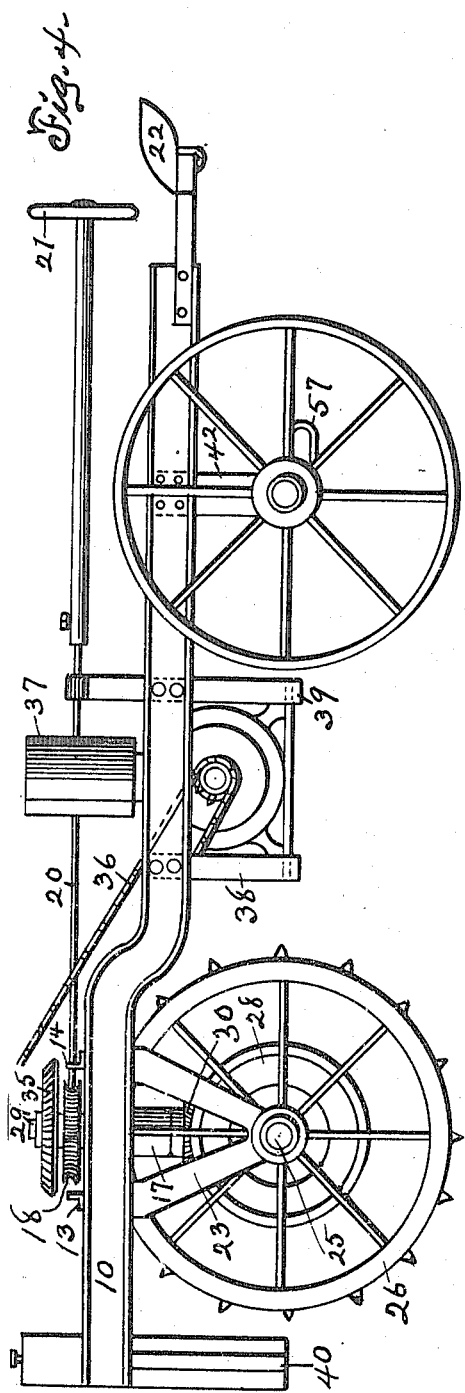
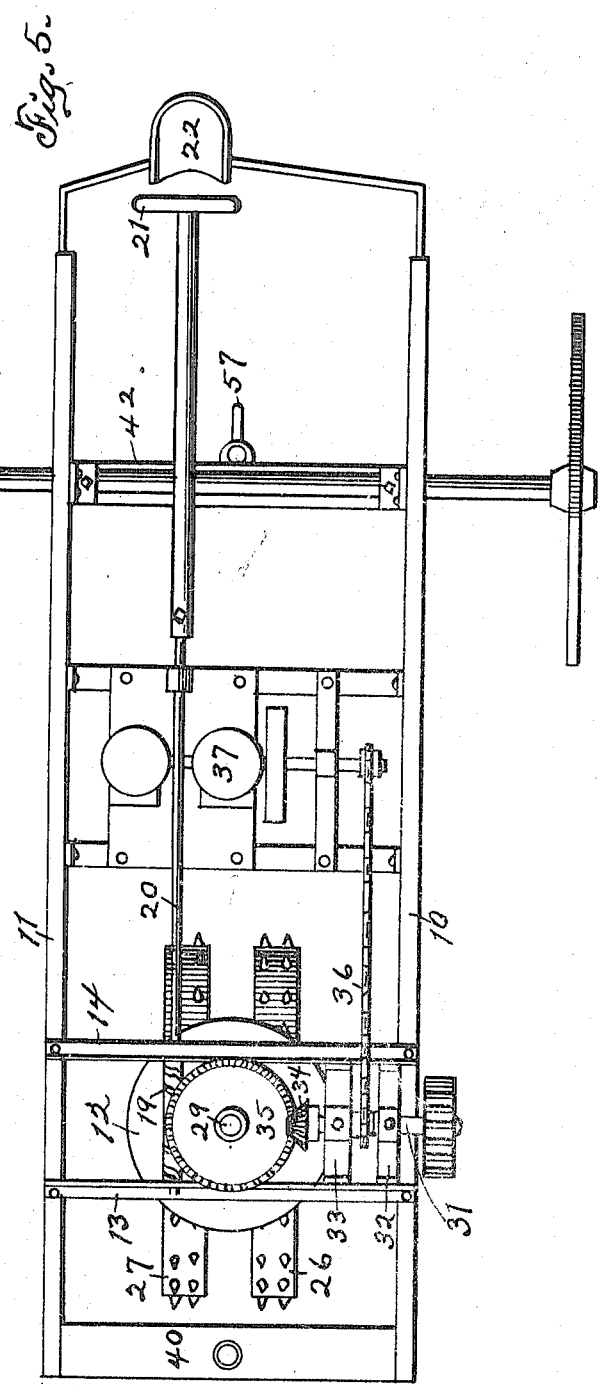

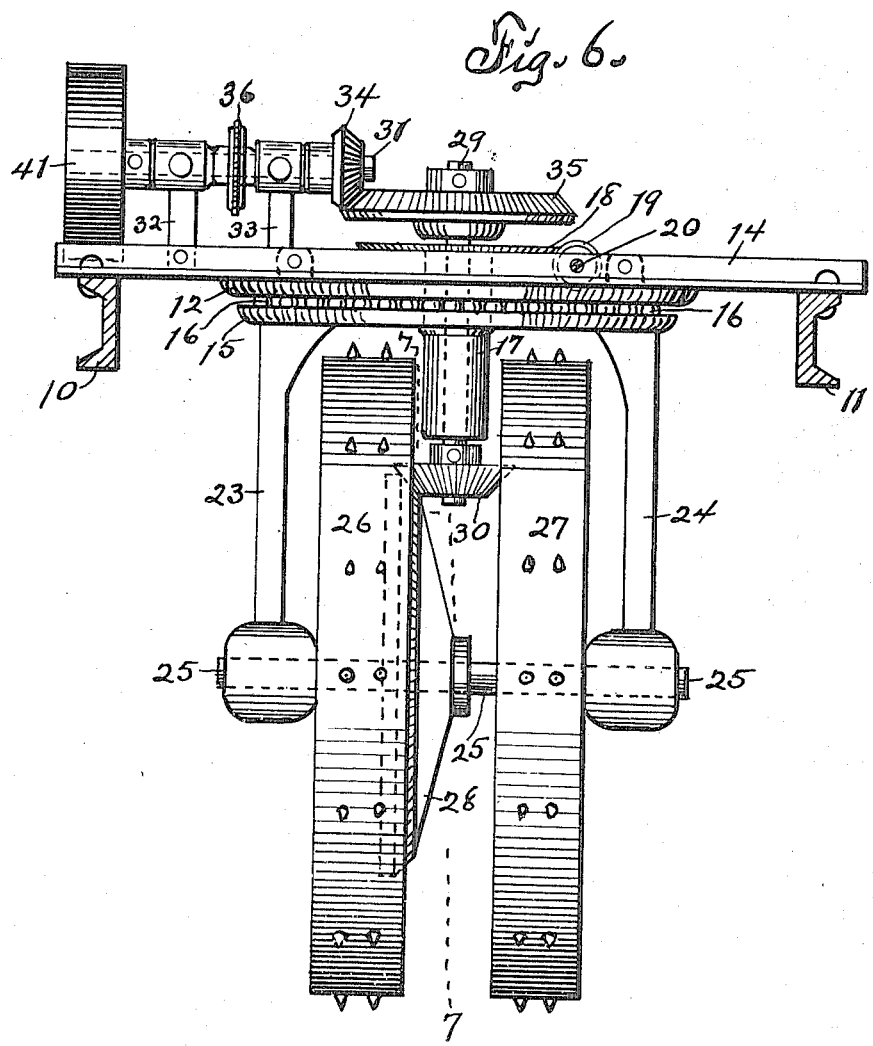

H. W. LEAVITT.
TRACTOR.
APPLICATION FILED SEPT. 16, 1913.

1,141,126.

Patented June 1, 1915.
4 SHEETS—SHEET 4.

Attest:
S. C. Sweet.
H. Sweet.

Inventor:
Harry W. Leavitt

UNITED STATES PATENT OFFICE.

HARRY W. LEAVITT, OF WATERLOO, IOWA.

TRACTOR.

1,141,126.   Specification of Letters Patent.   Patented June 1, 1915.

Application filed September 16, 1913. Serial No. 789,990.

*To all whom it may concern:*

Be it known that I, HARRY W. LEAVITT, citizen of the United States of America, and resident of Waterloo, Iowa, have invented a new and useful Tractor, of which the following is a specification.

The object of this invention is to provide an improved construction for tractors.

A further object of this invention is to provide a tractor driven by the traction of its front truck and supported at its rear end by an attached machine or truck which may be interchangeably selected in respect of the use to which said attached machine is to be put.

A further object of this invention is to provide a tractor with a combined steering and driving truck at its forward end.

My invention consists in the arrangements and combination of elements whereby a tractor is driven and steered by a front truck and whereby said tractor is supported at its rear end by an attached machine having no effect in steering and driving the tractor other than as a follower.

My invention consists further in the construction, arrangement and combination of elements hereinafter set forth, pointed out in my claims and illustrated by the accompanying drawing, in which—

Figure 8:
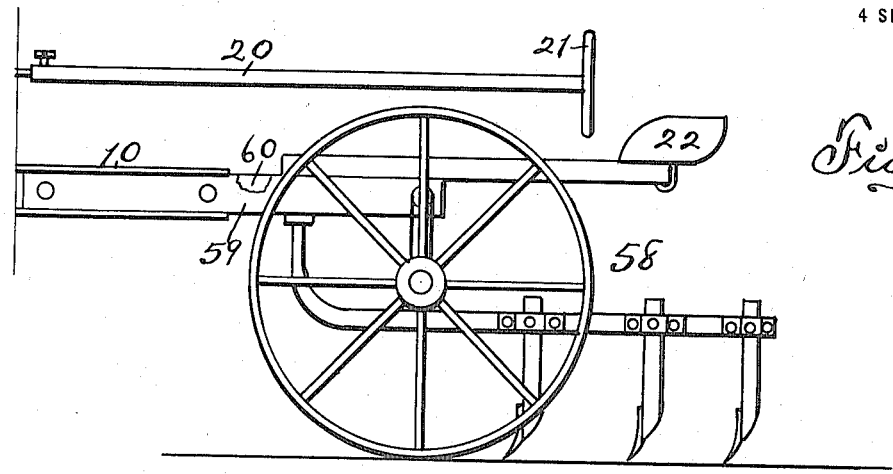
Figure 7:
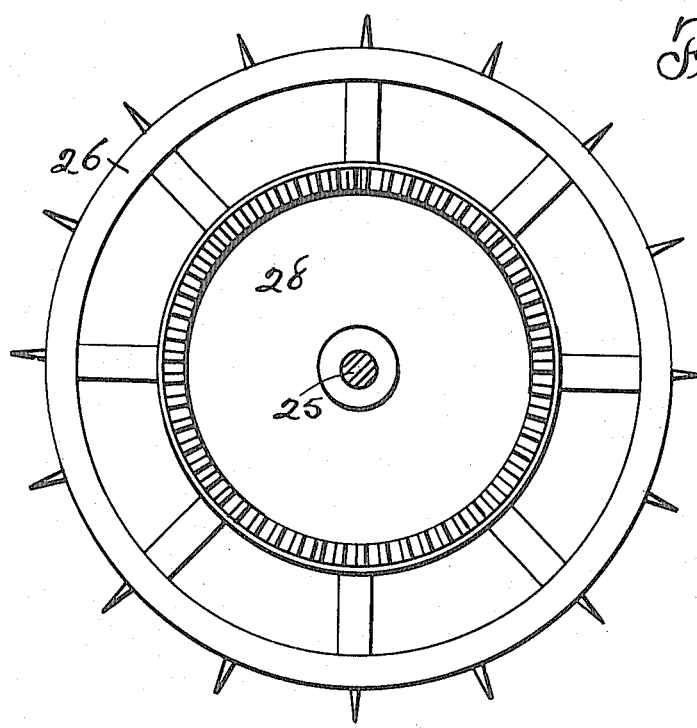

Figure 1 is a side elevation showing my improved tractor employed with a wheeled plow. Fig. 2 is a cross-section on the indicated line 2—2 of Fig. 1. Fig. 3 is a plan of the rear portion of the tractor frame and the wheeled plow attached thereto. Fig. 4 is a side elevation and Fig. 5 is a plan showing the tractor supported at its rear end by follower wheels and provided with draft attaching means. Fig. 6 is a cross-section on an enlarged scale on the indicated line 6—6 of Fig. 1. Fig. 7 is an elevation, partly in section, on the indicated line 7—7 of Fig. 6. Fig. 8 is a side elevation showing the rear portion of the tractor frame supported by a wheeled cultivator of conventional form.

In the construction of the machine as shown a main frame is built up of parallel channel beams 10, 11 offset between their ends and suitable cross bars, ties and braces. A turntable or fifth-wheel member 12 is carried by cross-bars 13, 14 between the forward end portions of the beams 10, 11 and a mating member 15 is arranged beneath the member 12 and the latter supports the former, there being roller or ball bearing 16 interposed if desired between said members. A sleeve 17 is formed on and extends above and below the member 15 and through the member 12 and a worm gear 18 is fixed to the upper end of said sleeve and is driven in either direction by a worm 19 on a shaft 20, said shaft being suitably journaled on the frame. The shaft 20 preferably is extensible by telescoping in order that the steering wheel, 21, thereon may be adjusted conveniently relative to a seat 22 slidably and adjustably mounted on the frame. Yoke arms 23, 24 are fixed to and support the member 15 and an axle shaft 25 is journaled in suitable bearings on the lower ends of said arms. The axle shaft 25 is carried in twin spaced traction wheels 26, 27 fixed thereto in adjacent relations and between the arms 23, 24. A bevel gear 28 is fixed to the shaft 25 between the traction wheels 26, 27. A shaft 29 is journaled in the sleeve 17 and carries a bevel pinion 30 on its lower end meshing with the gear 28. A driving shaft 31 is journaled in horizontal position in bearings 32, 33 carried by the cross-bars 13, 14 and a bevel pinion 34 on said shaft meshes with a bevel gear 35 fixed to the upper end portion of the shaft 29. The shaft 31 is driven by sprocket gearing 36 from a prime mover, such as a gasolene engine 37 underslung in supports 38, 39 carried by the beams 10, 11. A radiator 40, for the gasolene engine 37 is carried by the forward ends of the beams 10, 11 and may be connected to said engine and controlled in any suitable manner, as may also the engine be controlled by the driver. The shaft 31 also carries a belt pulley 41 on its outer end.

In Figs. 1, 2 and 3 a yoke 42 is shown extending downward from the rear ends of the beams 10, 11 and an axle shaft 43 is journaled in said yoke and is supported by wheels 44, 45 at its ends. Parallel yokes 46, 47, one above the other, are pivoted at their forward ends on the yoke 42 and axle shaft 43 respectively and are pivotally connected at their rear ends by spacing bars 48, 49. A plow stem 50 is arranged within the yoke 47 and is pivoted on a bolt 51. An arm 52 of the plow stem may be extended forward from the bolt 51 and be secured at its forward end by a break-pin 53 seated in the yoke 47. A plow 54 is secured to the stem 50. A bell-crank foot-lever 55 is suitably fulcrumed within the yoke 42 and connected pivotally to the yoke 47 in such manner that it may be employed to lift the plow 54. Other levers, balancing springs and the like well known elements may be provided to aid the operator in controlling the engine, and plow. A rolling coulter 56 may be carried on the beam 47 and used in connection with the plow 54.

In Figs. 4 and 5 the plow and elements auxiliary thereto are omitted and a clevis 57 is secured to the yoke 42 for convenience in attaching to the tractor a machine or implement to be drawn. It is to be understood that the plow wheels may be removed with the plow and the wheels shown in Figs. 4 and 5 may be of different character selected on account of their suitability to the work contemplated to be done by the tractor.

In Fig. 8 the rear end portion of the tractor frame is shown to be supported by a wheeled cultivator 58, shown conventionally but preferably of the two-row, straddle-raw type. The short tongues 59, 60 usually found on cultivators of this type, are bolted to the beams 10, 11 of the frame and the wheels of the cultivator serve as supporting wheels for the tractor. I am not concerned with the manufacture or construction of the cultivator and contemplate the use by the tiller of any suitable cultivator, or other machine or implement interchangeably with the tractor. In this connection attention is called to the arrangement of the steering-traction wheels 26, 27 in adjacent relations susceptible of passing freely between rows of standing corn or other growing plants without damage to the plants in either row and the desirable effect said wheels may have in packing the soil in advance of surface cultivation and in crushing lumps and clods. When the cultivator, or other drawn machine or implement is provided with a seat for the operator, the seat 22 may be removed from the tractor frame.

I claim as my invention—

1. A tractor comprising a main frame, a turntable member carried by the forward portion of said frame, a mating member arranged beneath the first member, roller bearings between said members, a sleeve formed on the lower member, worm-gearing connected with the uppper end of said sleeve, a yoke fixed to and depending from the lower member on opposite sides of said sleeve, an axle shaft journaled in said yoke and arranged horizontally beneath said sleeve, traction supporting wheels fixed to said axle shaft in adjacent relations and within said yoke, a bevel gear fixed to said axle shaft between said wheels, a shaft journaled in said sleeve, a bevel pinion fixed to the lower end of said shaft and meshing with said bevel gear, a driving shaft journaled on the frame, bevel gear connections between the driving shaft and the upper end of the vertical shaft, a motor geared to the driving shaft, and means for securing an implement to the rear end portion of the frame.

2. A tractor comprising a main frame composed of connected beams and cross-bars, a turntable member carried by the cross-bars between forward end portions of said beams, a mating turntable member arranged beneath the first member, roller bearings being interposed between said members, a sleeve formed on the lower member and extending through the upper member, a worm gear fixed to the upper end of said sleeve, a hand-operated worm adapted to rotate said worm gear, yoke arms fixed to and depending in spaced relations from the lower turntable member within the frame, an axle shaft journaled horizontally in and connecting the lower ends of said arms, counterpart traction wheels fixed in adjacent relations to said axle shaft and between said arms, a bevel gear fixed to said shaft between said wheels, a shaft journaled vertically in and extending at both ends from said sleeve, a bevel pinion fixed to the lower end of said vertical shaft and meshing with said bevel gear, a driving shaft journaled horizontally on the frame, bevel gear connections between the driving shaft and the upper end of the vertical shaft, a motor geared to the driving shaft, and means for securing an implement to the rear end of the frame.

3. A tractor comprising a main frame, a turntable member carried by the forward portion of said frame, a mating member arranged beneath the first member, roller bearings between said members, a yoke fixed to and depending from the lower member, an axle shaft journaled in said yoke, traction supporting wheels fixed to said axle shaft side by side and in spaced relations, a bevel gear fixed to said axle shaft between said wheels, a shaft journaled in upright position in said lower member and extending between said wheels, a bevel pinion fixed to the lower end of the latter shaft and meshing with said bevel gear, a driving shaft journaled on the frame, bevel gear connections between the driving shaft and the upper end of the upright shaft, a motor underslung on the central portion of said frame and geared to the driving shaft, and a hand-operated worm gear acting on the lower turntable member.

4. A tractor comprising a main frame formed of spaced beams side by side and offset upwardly between their ends and cross-bars connecting said beams, a turntable member carried by the higher forward portion of said frame, a mating member arranged beneath the first member, roller bearings between said members, a yoke fixed to and depending from the lower member, an axle shaft journaled in said yoke, traction supporting wheels fixed to said axle shaft side by side in spaced relations, a bevel gear fixed to said axle shaft between said wheels, a shaft journaled in upright position in said lower member and extending between said wheels, a bevel pinion fixed to the lower end of the latter shaft and meshing with said bevel gear, a driving shaft journaled on the frame, bevel gear connections between the driving shaft and the upper end of the upright shaft, a motor underslung on the central portion of said frame and geared to the driving shaft, and a hand-operated worm gear steering device acting on the lower turntable member and extending to the rear of said frame.

Signed by me at Des Moines, Iowa, this twenty eighth day of August, 1913.

HARRY W. LEAVITT.

Witnesses:
S. C. SWEET,
H. G. SWEET.